No. 745,684. PATENTED DEC. 1, 1903.
W. F. STIMPSON.
SPRING SCALE.
APPLICATION FILED NOV. 6, 1902.
NO MODEL. 2 SHEETS—SHEET 1.
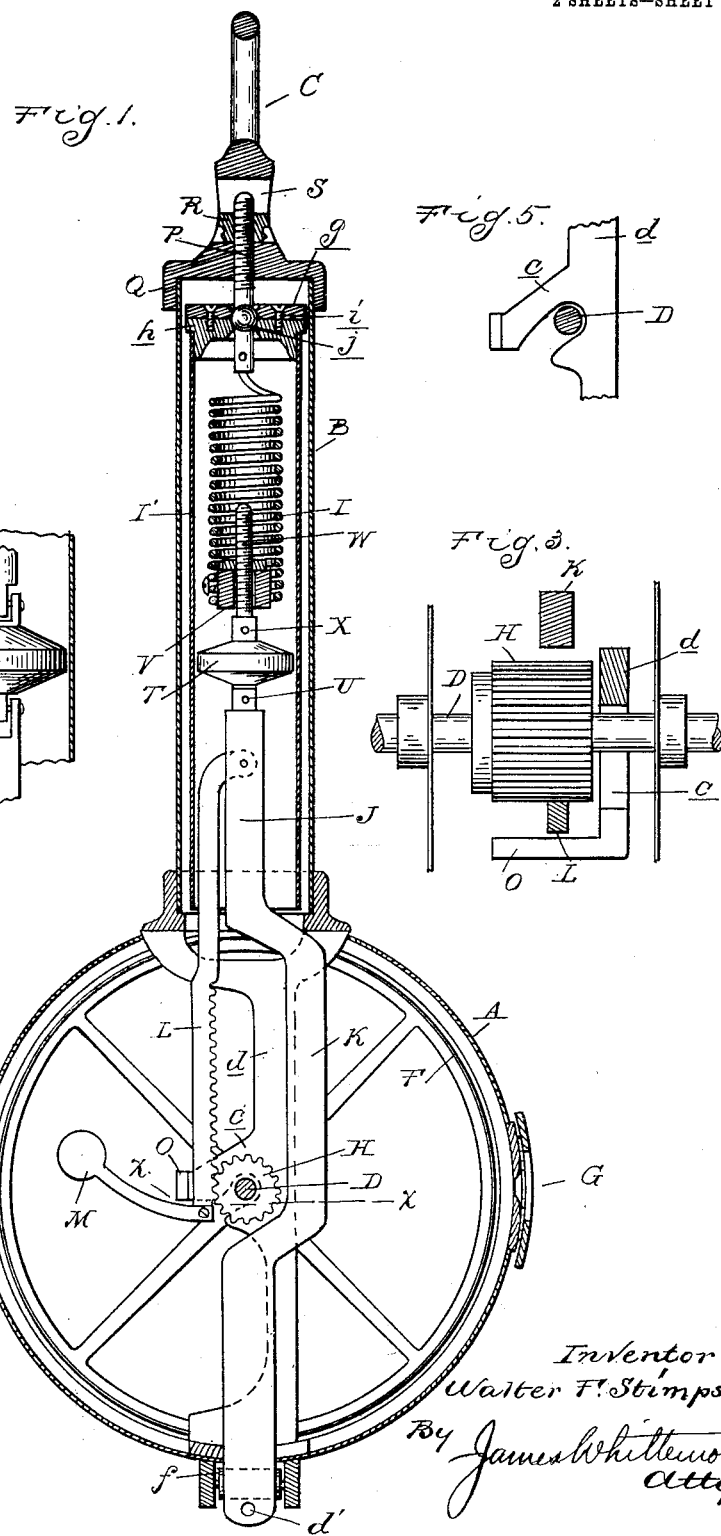
Witnesses
Ida Prath
Wm D Dogherty
Inventor
Walter F. Stimpson
By James Whittemore
Atty

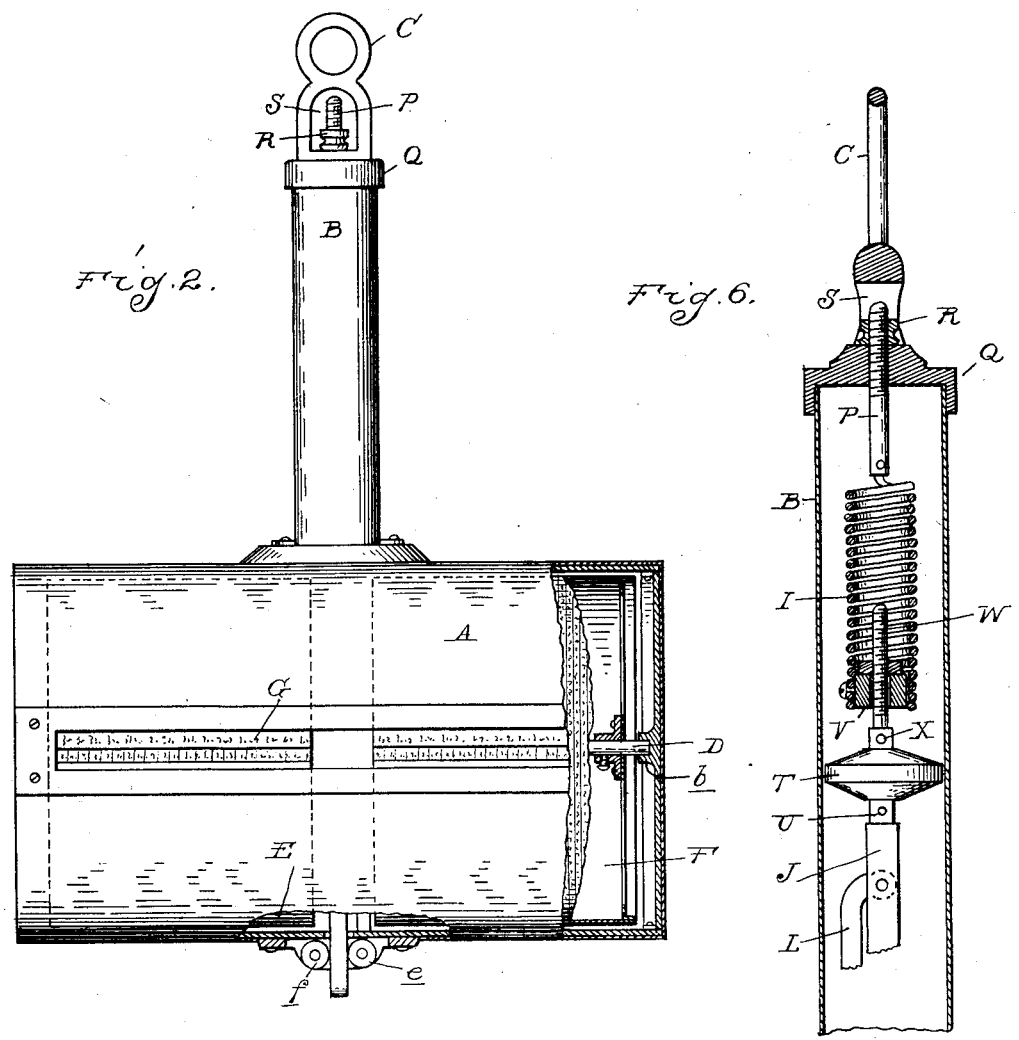

No. 745,684.　　　　　　　　　　　　　　　　　　　　　　　　Patented December 1, 1903.

UNITED STATES PATENT OFFICE.

WALTER F. STIMPSON, OF DETROIT, MICHIGAN.

SPRING-SCALE.

SPECIFICATION forming part of Letters Patent No. 745,684, dated December 1, 1903.

Application filed November 6, 1902. Serial No. 130,264. (No model.)

*To all whom it may concern:*

Be it known that I, WALTER F. STIMPSON, a citizen of the United States, residing at Detroit, in the county of Wayne and State of Michigan, have invented certain new and useful Improvements in Spring-Scales, of which the following is a specification, reference being had therein to the accompanying drawings.

The invention relates particularly to spring-balance scales comprising in their construction suitable indicating mechanism and spring-supported operating means therefor; and the invention consists, primarily, in novel and simple retarding mechanism serving to govern or regulate the action of the supporting-spring, and thereby prevent unnecessary oscillation of the indicating mechanism during the operation of weighing.

The invention further consists in the peculiar construction and arrangement of the retarding mechanism, in the novel combination of the scale parts, and, further, in other details of construction, as will be more fully hereinafter set forth.

In the drawings illustrating my invention, Figure 1 is a vertical central section through a spring-scale embodying my invention. Fig. 2 is a similar section taken at right angles to Fig. 1, some of the scale parts being shown in elevation. Fig. 3 is a section through the scale, taken on line $x\ x$, Fig. 1. Fig. 4 and Fig. 5 are detail views illustrating parts of the scale mechanism; and Fig. 6 is a section through the upper portion of the scale, showing a modified type of retarding means.

The reference-letter A designates an inclosing casing, preferably horizontal and adapted to contain the indicating mechanism of the scale, a type of which will be hereinafter set forth.

B is a vertical support for the casing A, which may be either a frame or, as shown in the drawings, an inclosing casing rigidly attached at its lower end to the casing A and carrying at its upper end a ring or apertured ear C, by means of which the scale may be suspended.

Journaled longitudinally within the casing A in end bearings $b$ is the shaft D, which is adapted to carry fixed thereto the drums E and F. The drums are arranged upon opposite sides of the center of the shaft and have upon their cylindrical surfaces computations of weight and of value, which are exhibited through an inspection-opening G, formed longitudinally in the casing-front.

To prevent the flexing of the shaft while the weighing is being performed, I arrange a stop $c$ in proximity to the central portion of the shaft and normally out of contact therewith. The stop is preferably in the form of a bracket carried upon a transverse bar $d$, extending centrally across the interior of the casing A and rigidly secured to the casing-framework. A pinion H is fixed upon the shaft intermediate of the drums and is adapted to be actuated by suitable operating means, which will be presently described.

The operating mechanism referred to is arranged within the frame or casing B and is supported therein by the coil-spring I. Preferably the operating devices consist of a draft-bar J, having an offset portion K formed therein to avoid the drum-shaft, and a rack-bar L, pivoted to the bar J at a point within the frame or casing B and extending to and engaging the pinion H. To hold the rack-pinion normally in engagement, a laterally and upwardly projecting weight M is attached to the lower end of the rack, as shown. Further means are provided for preventing the disengagement of the rack and pinion in the form of a guide-bar O, carried by and preferably a portion of the bracket $c$. This guide-bar passes behind the rack-bar in the manner indicated and is spaced therefrom sufficiently to prevent its disengagement. The draft-bar J extends through an opening formed in the bottom and central portion of the casing and is apertured, as at $d'$, to receive the usual goods-support in the form of a scale-pan. (Not shown.) Guide-rollers $e$ and $f$ are also carried by the casing A in proximity to the opening through which the draft-bar extends and serve to limit the swinging movement of the bar. The upper portion of the draft-bar is connected in the manner hereinafter set forth to the spring I, and the upper end of the spring is pivotally connected to an adjustable supporting-rod P, extending through the top or cap Q of the casing B. The rod P is threaded at its upper end and carries a thumb-nut R thereon, seated within an opening S at the top of the casing B.

The retarding mechanism for the spring is preferably a dash-pot, and this may be combined with the spring in a number of ways, one form of construction being shown in Fig. 1 and a modified arrangement of parts being shown in Fig. 6. In each case, however, one of the members of the dash-pot—that is, its casing or its piston or plunger—is supported by and is adapted to operate with the spring.

In Fig. 1 the dash-pot is shown as arranged within the support B, which in this instance might be either a bracket or casing. The piston T is interposed between the draft-bar J and the spring and is connected to each, and the dash-pot casing I' is supported upon the rod P and incloses the spring I and the piston.

In Fig. 6 the piston T, while being connected to the spring and the draft-rod in a manner similar to that previously described, travels within the support B, which is in the form of a casing and constitutes the casing member of the dash-pot.

In the operation of the scale when the draft-rod is pulled down by the weight of the goods in the scale-pan the action of the supporting-spring for the operating means is retarded by the dash-pot, so that the computing-drums are gradually operated and unnecessary oscillation thereof prevented.

To prevent the piston from binding against its casing when the scale assumes an angular position, I preferably employ a rocking or swinging dash-post. This type of retarding device is shown in Fig. 1, wherein the piston is adapted to swing with the spring, and the dash-pot casing has a rocking support permitting it to follow the lateral swinging movement of the spring and piston. The casing I' is preferably constructed with a head formed of two complementary sections $g$ and $h$, each of which is centrally apertured, the sections being connected by screws $i$. The apertures are so formed as to provide a socket adapted to receive the ball $j$ upon the rod P. A universal joint is thus formed between the casing I' and its support for the purpose set forth.

For the purpose of preventing the piston T from assuming an angular position relative to its casing other than that of a right angle it has a pivotal connection U with the draft-bar and preferably a similar connection with the spring. In the latter case an apertured head V is inserted within the lower end of the spring, and a headed rod W projects through the head V and is pivotally connected, as at X, with the piston.

It will be obvious from the construction of the parts that the retarding mechanism is so constructed that any tendency toward friction or binding of its parts is entirely prevented, and thus an accurate reading of the scale may be always obtained.

The piston T is preferably made to fit loosely within its casing of the rocking or stationary type and allows the air to pass upon opposite sides of the piston around its edges.

Attention is directed to the fact that while a particular type of indicating mechanism has been shown and described it is not essential that this style of indicator should be used. The invention—viz., the retarding mechanism—is capable of use in connection with any type of spring-scale regardless of the indicator employed. I do not wish to be limited, therefore, to the construction of mechanism illustrated in the drawings.

What I claim as my invention is—

1. In a scale, the combination with indicating mechanism, of a horizontally-disposed casing therefor, operating means for said indicating mechanism, a spring operatively connected to said operating means, a retarding device governing the action of the spring, said retarding device being arranged in approximate alinement with said spring, and a tubular casing for said spring and retarding device, said tubular casing being connected at its lower end to the horizontally-disposed casing.

2. In a scale, the combination with indicating mechanism, of a horizontally-disposed casing therefor, operating means for said indicating mechanism, a spring operatively connected to said operating means, a retarding device governing the action of the spring, and a tubular casing for said spring and retarding device, said tubular casing being connected at its lower end to the horizontally-disposed casing.

3. In a spring-scale, the combination with an inclosing casing, of a shaft extending lengthwise of the casing and journaled therein, indicating mechanism upon the shaft, operating mechanism therefor, and a stop in proximity to the central portion of the shaft for limiting the flexing of the shaft said stop overhanging the shaft and arranged normally out of engagement therewith.

4. In a spring-scale, the combination with an inclosing casing, of a shaft extending lengthwise of the casing and journaled therein, indicating mechanism upon the shaft, operating mechanism therefor, and a stop for limiting the flexing of the shaft, said stop overhanging the shaft and arranged normally out of engagement therewith.

5. In a scale, the combination with an inclosing casing, of indicating mechanism, operating means for said indicating mechanism, a spring operatively connected to said operating means above the same, a retarding device connected to and governing the action of the spring, and means in the casing for supporting said spring and retarding device whereby they may swing laterally.

6. In a spring-scale, the combination with an inclosing casing, of indicating mechanism, means for operating said indicating mechanism, a spring and a retarding device for said operating means, and a rocking connection in the casing for said retarding device.

7. In a spring-scale, the combination with indicating mechanism, of a horizontally-disposed casing therefor, means for operating said indicating mechanism, a spring and a retarding device for said operating means, and a tubular casing for said retarding device secured at its lower end to said horizontally-disposed casing.

8. In a spring-scale, the combination with indicating mechanism, of a horizontally-disposed casing therefor, means for operating said indicating mechanism, a spring and a retarding device for said operating means mounted to swing laterally, and a tubular casing for said retarding device secured at its lower end to said horizontally-disposed casing.

9. In a spring-scale, the combination with indicating mechanism, of a horizontally-disposed casing therefor, means for operating said indicating mechanism, a spring operatively connected to said operating means, a retarding device for said operating means, and a tubular casing for said spring and retarding device secured at its lower end to said horizontally-disposed casing.

10. In a spring-scale, the combination with indicating mechanism, of a horizontally-disposed casing therefor, means for operating said indicating mechanism, a spring operatively connected to said operating means, a retarding device for said operating means mounted to swing laterally, and a tubular casing for said retarding device and spring secured at its lower end to said horizontally-disposed casing.

11. In a scale the combination with a casing, of indicating mechanism, operating means for said mechanism, a spring operatively connected to said operating means, a retarding device in substantial alinement with said spring, and a pivot in the casing from which the spring and retarding device are suspended.

12. In a scale, the combination of indicating mechanism, operating means for said indicating mechanism, a spring secured at its upper end, and at its lower end supporting said operating means, and a swinging dash-pot operatively associated with said spring, the casing of the dash-pot inclosing the spring.

13. In a scale, the combination with a vertical casing, of a horizontally-disposed casing secured to the lower end thereof, indicating mechanism within the horizontal casing, operating means for the indicating mechanism, a spring in the vertical casing supporting said operating means, a dash-pot also within the vertical casing, and an operative connection between the dash-pot and the supporting-spring.

14. In a scale, the combination with a vertical casing, of a horizontally-disposed casing secured to the lower end thereof, indicating mechanism within the horizontal casing, operating means for the indicating mechanism, a spring in the vertical casing supporting said operating means, a retarding device also within the vertical casing, and an operative connection between the retarding device and the supporting-spring.

15. In a scale, the combination with a casing, of indicating mechanism, spring-supported operating means for the indicating mechanism, and a swinging dash-pot suspended from the upper portion of the casing operatively associated with said spring and inclosing the same.

16. In a spring-scale, the combination with a vertical frame or casing, of indicating mechanism carried thereby, an adjustable supporting member depending within said frame or casing, operating means for the indicating mechanism, a piston connected to said operating means, a spring connection between the operating means and the supporting member, and a dash-pot casing mounted upon the supporting member for rocking movement and suspended therefrom to inclose the spring connection and piston.

17. In a spring-scale, the combination with indicating mechanism, of operating means therefor, a spring supporting the operating means, a piston having connections with said spring and operating means, and a laterally-movable dash-pot casing inclosing the piston, said casing being open at one end.

18. In a spring-scale, the combination with indicating mechanism, of operating means therefor, a spring for supporting said operating means, a piston interposed between said spring and operating means and having pivotal connections with each, and a dash-pot casing inclosing the piston.

In testimony whereof I affix my signature in presence of two witnesses.

WALTER F. STIMPSON.

Witnesses:
M. B. O'DOGHERTY,
IDA PORATH.